(12) United States Patent
Kim et al.

(10) Patent No.: US 12,117,228 B2
(45) Date of Patent: Oct. 15, 2024

(54) REFRIGERATOR

(71) Applicant: LG ELECTRONICS INC., Seoul (KR)

(72) Inventors: Myungsang Kim, Seoul (KR); Yoosool Yoon, Seoul (KR); Cheolyeon Lee, Seoul (KR); Hoyong Jang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 393 days.

(21) Appl. No.: 17/442,275

(22) PCT Filed: May 3, 2019

(86) PCT No.: PCT/KR2019/005338
§ 371 (c)(1),
(2) Date: Sep. 23, 2021

(87) PCT Pub. No.: WO2020/196987
PCT Pub. Date: Oct. 1, 2020

(65) Prior Publication Data
US 2022/0154989 A1    May 19, 2022

(30) Foreign Application Priority Data

Mar. 26, 2019   (KR) .................. 10-2019-0034682

(51) Int. Cl.
*F25C 5/182*   (2018.01)
*F25C 1/04*    (2018.01)
(Continued)

(52) U.S. Cl.
CPC .............. *F25C 5/182* (2013.01); *F25C 1/04* (2013.01); *F25C 5/08* (2013.01); *F25C 5/22* (2018.01);
(Continued)

(58) Field of Classification Search
CPC .... F25C 5/182; F25C 1/04; F25C 5/08; F25C 5/22; F25C 2305/024; F25C 2400/10;
(Continued)

(56) References Cited

U.S. PATENT DOCUMENTS

| 7,090,141 B2* | 8/2006 | Roh ................. F25D 29/00 236/51 |
| 8,106,539 B2* | 1/2012 | Schatz ............... B60L 53/63 307/104 |

(Continued)

FOREIGN PATENT DOCUMENTS

| EP | 3270078 A2 * | 1/2018 | ............... F25B 9/08 |
| EP | 3951294 A1 * | 2/2022 | ............... F25C 1/04 |

(Continued)

OTHER PUBLICATIONS

European Search Report issued in Application No. 19920766.3 dated Feb. 24, 2023.

(Continued)

*Primary Examiner* — Ljiljana V. Ciric
(74) *Attorney, Agent, or Firm* — KED & ASSOCIATES, LLP

(57) ABSTRACT

A refrigerator may include a body having an open front; a refrigerator door configured to shield the open front of the body; an ice storage provided on the refrigerator door to store ice; an ice-making chamber provided in the body to produce the ice; an ice maker disposed in the ice-making chamber to transfer the produced ice to the ice storage; a power receiver provided at the ice maker to receive wireless power; and a power transmitter disposed on one side of one of the body and the ice-making chamber to transmit wireless power to the power receiver.

18 Claims, 13 Drawing Sheets

(51) Int. Cl.
*F25C 5/08* (2006.01)
*F25C 5/20* (2018.01)
*F25D 23/04* (2006.01)
*H02J 50/12* (2016.01)
*H02J 50/80* (2016.01)

(52) U.S. Cl.
CPC .............. *F25D 23/04* (2013.01); *H02J 50/12* (2016.02); *F25C 2305/024* (2021.08); *F25C 2400/10* (2013.01); *F25D 2400/40* (2013.01); *H02J 50/80* (2016.02)

(58) Field of Classification Search
CPC ...... F25D 23/04; F25D 2400/40; H02J 50/12; H02J 50/80
See application file for complete search history.

(56) References Cited

U.S. PATENT DOCUMENTS

| | | | |
|---|---|---|---|
| 8,635,877 B2 * | 1/2014 | Kim | F25C 5/187 |
| | | | 62/344 |
| 9,841,217 B2 | 12/2017 | Lee et al. | |
| 9,989,474 B2 * | 6/2018 | Song | G01N 31/221 |
| 10,302,353 B2 * | 5/2019 | Uchida | F25D 17/065 |
| 10,322,616 B2 * | 6/2019 | Ling | B60P 3/20 |
| 10,340,741 B2 * | 7/2019 | Lee | F25D 29/008 |
| 10,539,355 B2 * | 1/2020 | Jeong | F25C 1/22 |
| 10,817,834 B2 * | 10/2020 | McCoy | G16H 20/10 |
| 11,444,492 B2 * | 9/2022 | Melone | A47J 27/004 |
| 11,881,723 B2 * | 1/2024 | Melone | A47J 27/004 |
| 2010/0308073 A1 | 12/2010 | Devilbiss et al. | |
| 2013/0231791 A1 * | 9/2013 | Jacobs | G06Q 10/06 |
| | | | 700/291 |
| 2016/0131408 A1 * | 5/2016 | Bertolini | F25C 5/22 |
| | | | 62/344 |
| 2017/0160005 A1 * | 6/2017 | Park | G01N 33/02 |
| 2018/0017307 A1 | 1/2018 | Jeong et al. | |
| 2020/0370360 A1 * | 11/2020 | Lowry | E05G 1/10 |
| 2023/0047137 A1 * | 2/2023 | Park | F25D 23/04 |

FOREIGN PATENT DOCUMENTS

| | | | | |
|---|---|---|---|---|
| EP | 4286778 A1 * | 12/2023 | ............. | F25D 23/04 |
| JP | 2016-023852 | 2/2016 | | |
| KR | 10-2010-0038514 | 4/2010 | | |
| KR | 10-2011-0139844 | 12/2011 | | |
| KR | 10-2018-0124748 | 11/2018 | | |
| KR | 10-2019-0008034 | 1/2019 | | |
| KR | 10-2019-0014051 | 2/2019 | | |
| KR | 102163741 B1 * | 10/2020 | | |
| KR | 20200117316 A * | 10/2020 | | |
| KR | 102211793 B1 * | 2/2021 | | |
| KR | 20210129239 A * | 10/2021 | | |
| WO | WO-2020196987 A1 * | 10/2020 | ................ | F25C 1/04 |

OTHER PUBLICATIONS

International Search Report dated Dec. 26, 2019 issued in Application No. PCT/KR2019/005338.

* cited by examiner

REFRIGERATOR

CROSS-REFERENCE TO RELATED PATENT APPLICATIONS

This application is a U.S. National Stage Application under 35 U.S.C. § 371 of PCT Application No. PCT/KR2019/005338, filed May 3, 2019, which claims priority to Korean Patent Application No. 10-2019-0034682, filed Mar. 26, 2019, whose entire disclosures are hereby incorporated by reference.

TECHNICAL FIELD

The present disclosure relates to a refrigerator.

BACKGROUND ART

In general, refrigerators are home appliances that allow low-temperature storage of food in an internal storage space that is shielded by a door. The stored food can be stored in an optimal state by cooling the inside of a storage space using cold air generated through heat exchange with a refrigerant circulating through a refrigeration cycle.

The refrigerators are becoming larger and more multi-functional with changes in dietary habits and user preferences. Accordingly, the refrigerators equipped with various structures and convenience devices for user convenience and freshness of stored food have been released.

On the other hand, a refrigerator is provided with an ice dispenser that provides ice produced by an ice maker to the outside. As an example, Korean Patent Publication No. 10-2010-0038514 discloses "ice dispenser and refrigerator having the same".

According to the prior art, a motor for providing power required by an ice maker is provided in the refrigerator. The motor provided in the refrigerator and the ice maker in an ice-making chamber are connected to each other by a motor shaft, and the ice maker operates with power of the motor. In this case, since the motor and the ice maker are connected to each other through a motor shaft, it is difficult to separate the ice maker from the motor, and maintenance of the ice maker and the motor is inconvenient. In addition, since a power cable, a power terminal, etc. for supplying power to the motor need to be disposed inside the refrigerator, an electric accident may occur due to a low temperature environment and moisture in the refrigerator. In addition, there is a problem in that the cold air inside the ice-making chamber is leaked to the outside of the ice-making chamber by an opening formed in a portion of the refrigerator and the ice-making chamber such that the motor shaft passes through the opening.

DISCLOSURE

Technical Problem

The present disclosure may provide a refrigerator capable of facilitating maintenance of an ice maker and a power source that transmits power to the ice maker.

The present disclosure may provide a refrigerator to which power is stably supplied by improving a power supply structure for supplying power to a power source for transmitting power to an ice maker.

The present disclosure may provide a refrigerator capable of preventing cold air in an ice-making chamber from leaking out of the ice-making chamber.

Technical Solution

In the refrigerator according to the present disclosure, the power transmitter that transmits wireless power is provided in the body and the power receiver that receives the wireless power is provided in the ice maker, thus improving the power supply method by which power is supplied from the body to the ice maker.

In the refrigerator according to the present disclosure, the power transmitter that transmits wireless power is provided in the refrigerator door, and the power receiver that receives wireless power is provided in the storage basket of the ice storage, thereby improving the power supply method by which power is supplied from the refrigerator door to the storage basket.

The refrigerator according to the present disclosure can improve portability of the ice maker by modularizing the configuration of the ice maker, and facilitate maintenance of the ice maker while the ice maker is being separated from the body.

The refrigerator according to the present disclosure can improve the portability of the storage basket by modularizing the configuration of the storage basket, and facilitate maintenance of the storage basket when the storage basket is being separated from the refrigerator door.

Advantageous Effects

According to the present disclosure, the structure of the ice maker can be simplified because power required to operate the ice maker is supplied by a wireless power supply method.

According to the present disclosure, the structure of the storage basket can be simplified because power required to operate the storage basket is supplied by a wireless power supply method.

According to the present disclosure, the ice maker and the storage basket can be modularized and easily separated from the refrigerator, thus facilitating maintenance of the ice maker and the storage basket.

According to the present disclosure, the power cable for supplying power to the inside of the refrigerator can be omitted, thus additionally securing the storage space of the refrigerator.

MODE FOR INVENTION

Figure 1:
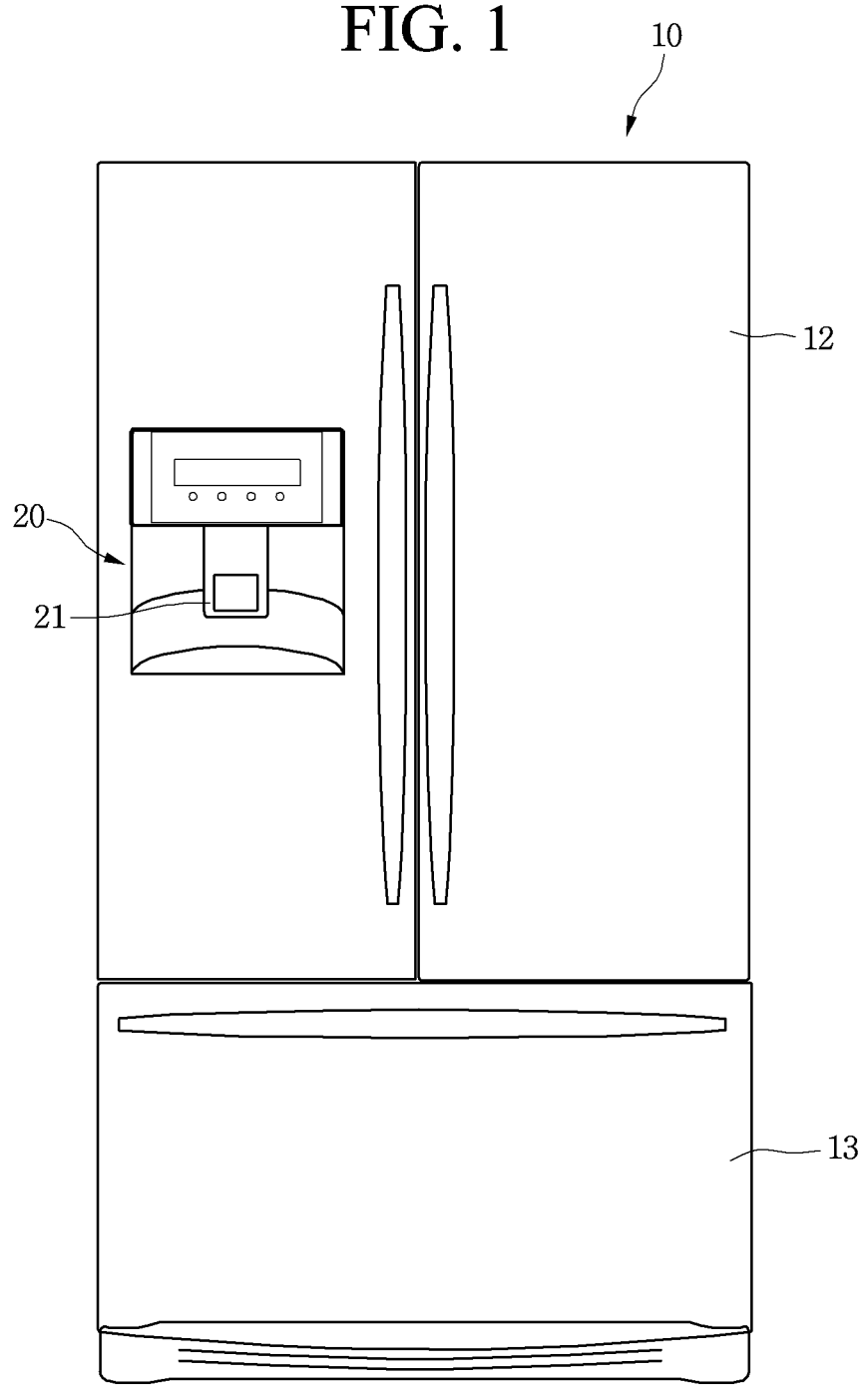
FIG. 1 is a front view showing an exterior of a refrigerator according to an embodiment of the present disclosure.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. It should be noted that if it is described in the specification that one component is "connected," "coupled" or "joined" to another component, the former may be directly "connected," "coupled," and "joined" to the latter or "connected", "coupled", and "joined" to the latter via another component.

Figure 2:
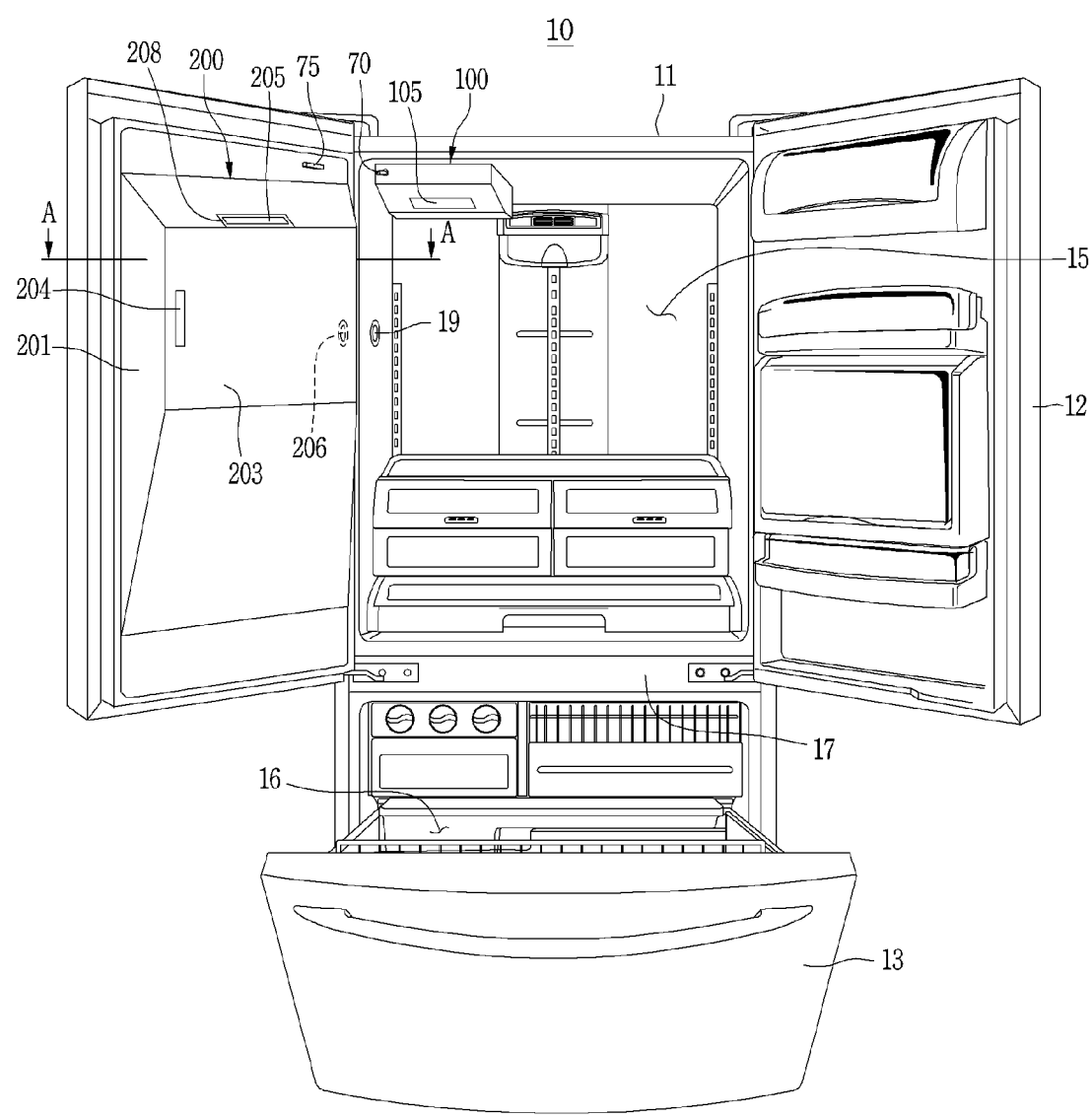
FIG. 2 is a perspective view showing an interior of a refrigerator according to an embodiment of the present disclosure.
Figure 3:
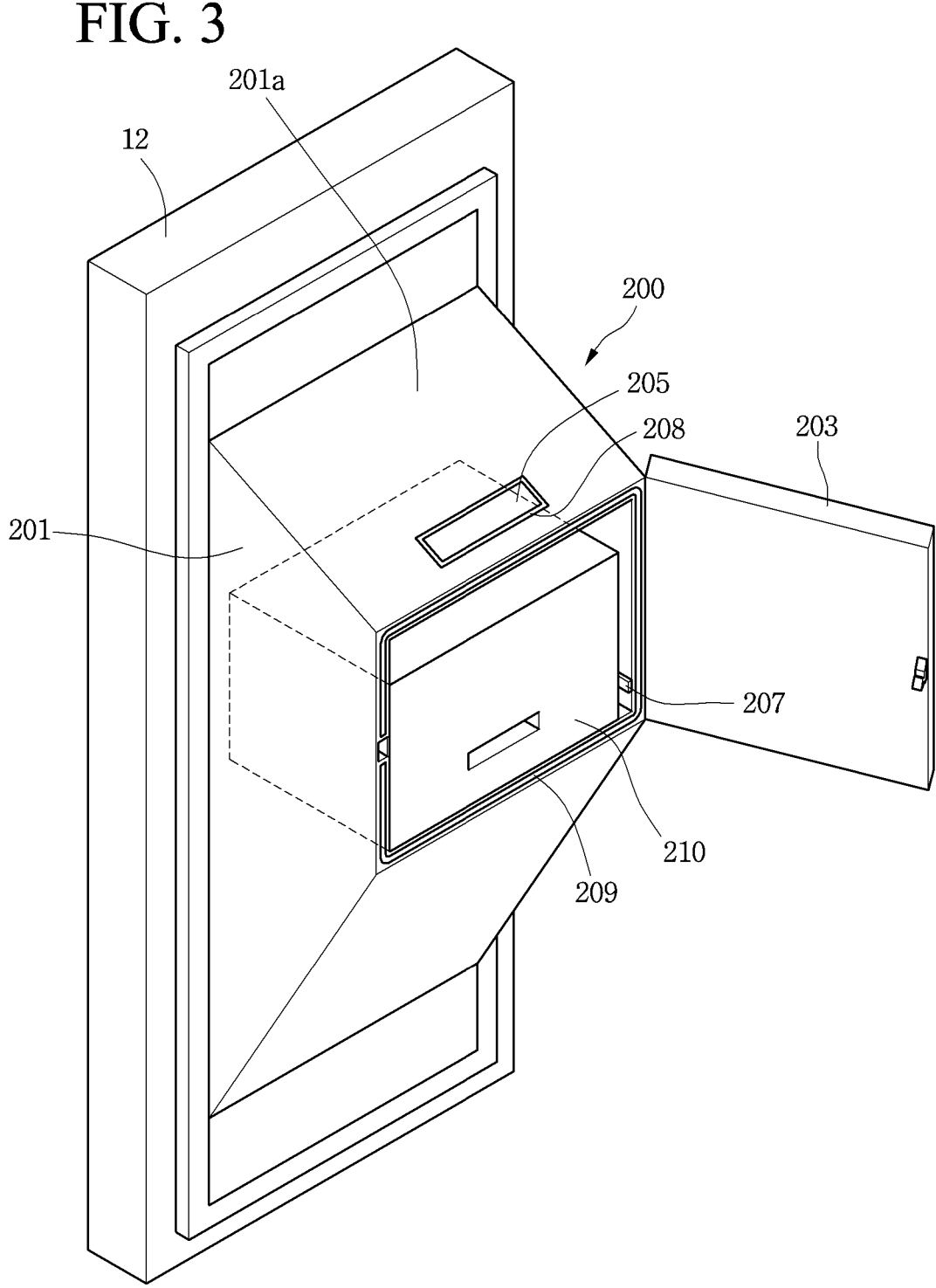
FIG. 3 is a perspective view illustrating an internal configuration of an ice storage according to an embodiment of the present disclosure.

FIG. 1 is a front view showing an exterior of a refrigerator according to an embodiment of the present disclosure, FIG. 2 is a perspective view showing an interior of a refrigerator according to an embodiment of the present disclosure, and FIG. 3 is a perspective view illustrating an internal configuration of an ice storage according to an embodiment of the present disclosure.

Referring to FIGS. 1 to 3, a refrigerator 10 according to an embodiment of the present disclosure may include a body 11 having an open front, in which a refrigerating chamber 15 and a freezing chamber 16 are formed therein. The refrigerating chamber 15 may be formed above the freezing chamber 16. The refrigerating chamber 15 and the freezing chamber 16 may be partitioned by a partition wall 17.

The refrigerator 10 may include a refrigerating chamber door 12 rotatably coupled to the front of the refrigerating chamber 15 and a freezing chamber door 13 provided to be withdrawn to the front of the freezing chamber 16. A plurality of the refrigerating chamber doors 12 may be provided on both sides of the refrigerating chamber 15. The refrigerating chamber door 12 and the freezing chamber door 13 may be collectively referred to as a refrigerator door.

A dispenser device 20 operable to dispense water or ice may be provided in the front of the refrigerator compartment door 12. The dispenser device 20 may include a pressing portion 21 that may be pressed to dispense the water or ice.

The body 11 may include an ice-making chamber 100 in which ice is produced. The ice-making chamber 100 may be disposed on a portion of the upper end of the refrigerating chamber 15. An ice outlet 105 for discharging the ice produced in the ice-making chamber 100 may be formed in the front surface of the ice-making chamber 100.

Meanwhile, at least a portion of the front surface of the ice-making chamber 100 may be formed to be inclined downward. In this case, the ice outlet 105 may be formed in an inclined surface of the front surface of the ice-making chamber 100.

It should be noted that various embodiments may be proposed with respect to the formation position of the ice outlet 105. Although not shown in the drawings, the ice outlet 105 may be formed in the lower surface of the ice-making chamber 100 such that ice is discharged downward.

The ice storage 200 for storing ice discharged from the ice-making chamber 100 may be provided in the refrigerating chamber door 12. The ice storage 200 may be disposed in the inside of the refrigerating chamber door 12 to communicate with the ice-making chamber 100 when the refrigerating chamber door 12 is closed.

The ice storage 200 may include a housing 201 defining an external surface, a door 203 rotatably coupled to the front of the housing 201, and a storage basket retractably accommodated in the housing 201. The housing 201 may be made of a material having strong thermal insulation properties to minimize heat exchange between the refrigerating chamber 15 and the inside of the ice storage 200.

An ice inlet 205 through which the ice discharged from the ice outlet 105 is introduced into the ice storage 200 may be formed in the housing 201. The ice inlet 205 may be formed to have a size corresponding to the size of the ice outlet 105.

In addition, a gasket 208 may be provided at the edge of the ice inlet 205 to prevent cold air from leaking while the ice inlet 205 is in close contact with the ice outlet 105. Although not shown in the drawings, the gasket 208 may be provided on the edges of the ice outlet 105.

A coupling surface 201a formed to be inclined to correspond to the front surface of the ice-making chamber 100 may be formed on the upper surface of the housing 201. When the refrigerating chamber door 12 is closed, the inclined front surface of the ice-making chamber 100 and the coupling surface 201a may be in close contact with each other. In addition, the ice inlet 205 may be formed in the coupling surface 201a.

It should be noted that various embodiments may be proposed for the shape of the coupling surface 201a. Although not shown in the drawings, when the ice outlet 105 is formed in the lower surface of the ice-making chamber 100, the coupling surface 201a may be formed horizontally to correspond to the lower surface of the ice-making chamber 100. In this case, the ice inlet 205 may be disposed in the coupling surface 201a formed horizontally.

A grippable door handle 204 may be formed on the door 203 to open the door 203. The door handle 204 may be formed to be depressed toward the rear from the door 203. In addition, the door 203 is provided with a holding hook that engages the housing 201, and a holding groove may be formed in the housing 201 at a position corresponding to the holding hook.

A sealing member 209 for preventing cold air in the ice storage 200 from leaking may be provided on the edges the open front of the housing 201. When the door 203 is closed, the housing 201 may be in close contact with the door 203 by the sealing member 209.

A guide rail 207 for guiding the insertion/withdrawal of the storage basket 210 may be provided on the inner surface of the housing 201. A plurality of guide rails 207 may be provided on both sides of the housing 201. It should be noted that the position of the guide rail 207 is not limited to any one, and the guide rail 207 may be provided on the lower surface of the housing 201, unlike shown in the drawings.

Also, a cold air outlet hole 206 through which the cold air supplied to the ice storage 200 is discharged may be formed at one side of the housing 201. That is, the cold air flowing from the ice-making chamber 100 to the ice storage 200 may be discharged through the cold air outlet hole 206.

A cold air inlet hole 19 through which cold air discharged from the cold air outlet hole 206 is introduced may be formed in the body 11. The cold air inlet hole 19 may be formed at a position communicating with the cold air outlet hole 206 when the refrigerating chamber door 12 is closed.

The cold air introduced through the cold air inlet hole 19 may flow into the freezing chamber 16.

Meanwhile, a door switch 70 for detecting whether the refrigerator compartment door 12 is opened or closed may be provided in an external portion of the ice-making chamber 100. The door switch 70 may be formed to protrude from the front surface of the ice-making chamber 100 toward the front.

In addition, the refrigerating chamber door 12 may be provided with a switch pressing portion 75 that allows the refrigerating chamber door 12 to come into contact with the door switch 70 when the refrigerating chamber door 12 is closed. The switch pressing portion 75 may be formed to protrude from an inner surface of the refrigerating chamber door 12.

Although the door switch 70 is shown as being provided in the ice-making chamber 100, the door switch 70 may be disposed at a lower portion or one side of the storage compartment 15.

In addition, the switch pressing portion 75 may be disposed at a lower portion or one side of the refrigerating chamber door 12 according to the position of the door switch 70. On the other hand, the switch pressing portion 75 may be omitted and the refrigerating chamber door 12 may be configured to directly press the switch 70.

Figure 4:
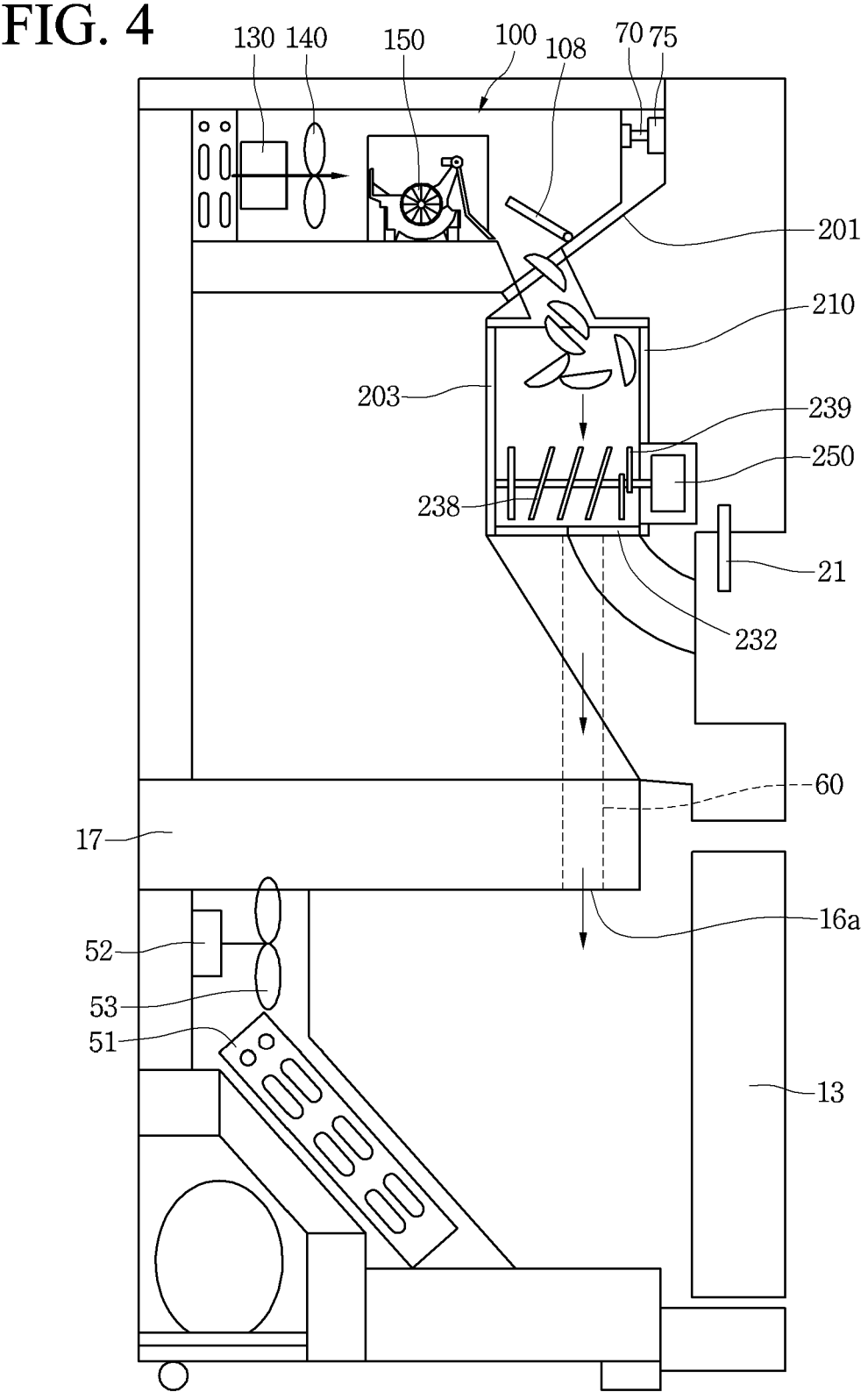
FIG. 4 is a view showing an operation of a refrigerator according to an embodiment of the present disclosure.

FIG. 4 is a view showing an operation of a refrigerator according to an embodiment of the present disclosure.

Referring to FIG. 4, a first heat exchanger 51 which generates cold air to be supplied to the freezing chamber 16, and a first fan motor 52 and a first blowing fan 53, which blow the cold air generated in the first heat exchanger 51 to the freezing chamber 16 may be provided at the rear side of the freezing chamber 16 according to an embodiment of the present disclosure.

In addition, the ice-making chamber 100 may include an ice maker 150 which produces ice from supplied water, a second heat exchanger 120 which is provided at one side of the ice maker 150, to generate cold air through heat exchange with outside air, and a second fan motor 130 and a second blowing fan 140 which blow the cold air generated in the second heat exchanger 120 toward the ice maker 150.

In this embodiment, the first heat exchanger 51 that supplies cold air to the freezing chamber 16 and the second heat exchanger 120 that supplies cold air to the ice-making chamber 100 are separately provided. However, the second heat exchanger 51 may not be provided, and the cold air in the second heat exchanger 51 that supplies cold air to the freezing chamber 16 may be supplied to the ice-making chamber 100. In this case, a cold air duct for supplying cold air from the first heat exchanger 51 to the ice-making chamber 100 and a damper for controlling opening and closing of the cold air duct may be further included. In addition, although it is described in this embodiment that the ice-making chamber 100 is provided in the body 11, the ice-making chamber 100 may be provided in the refrigerator door 12. When the ice-making chamber 100 is provided in the refrigerator door 12, the ice storage 200 may be disposed below the ice-making chamber 100.

When water is supplied to the ice maker 150, ice having a predetermined shape may be manufactured. The ice produced by the ice maker 150 may be separated from the ice maker 150 and may fall down to the storage basket 210 and be stored in the storage basket 210. The configuration of the ice maker 150 will be described in detail with reference to FIGS. 5 and 6.

Meanwhile, a discharge control unit 108 for selectively shielding the ice outlet 105 may be provided in the ice-making chamber 100. The discharge control unit 108 may be controlled to be opened while ice is separated from the ice maker 150 and discharged to the ice storage 200, and may be controlled to be shielded when ice is not separated from the ice maker 150.

Although not shown in the drawings, the discharge control unit 108 may be provided on the side of the ice storage 200 to selectively shield the ice inlet 205.

Also, when the user presses the pressing portion 21, the shutter 232 may rotate to open an outlet 231, and the ice may be discharged to the outside through the dispenser device 20.

Meanwhile, cold air supplied to the ice maker 150 may be introduced into the freezing chamber 16 through the ice storage 200. A return duct 60 may be provided between the cold air inlet hole 19 formed in the refrigerating chamber 15 and the freezing chamber 16. The return duct 60 may extend from one side wall of the refrigerating chamber 15 through the partition wall 17. Also, the cold air flowing through the return duct 60 may be introduced into the freezing chamber 16 through a freezing chamber inlet 16a.

That is, the cold air inlet hole 19 is formed at one end of the return duct 60, and the freezing chamber inlet 16a is formed at the other end.

Figure 5:
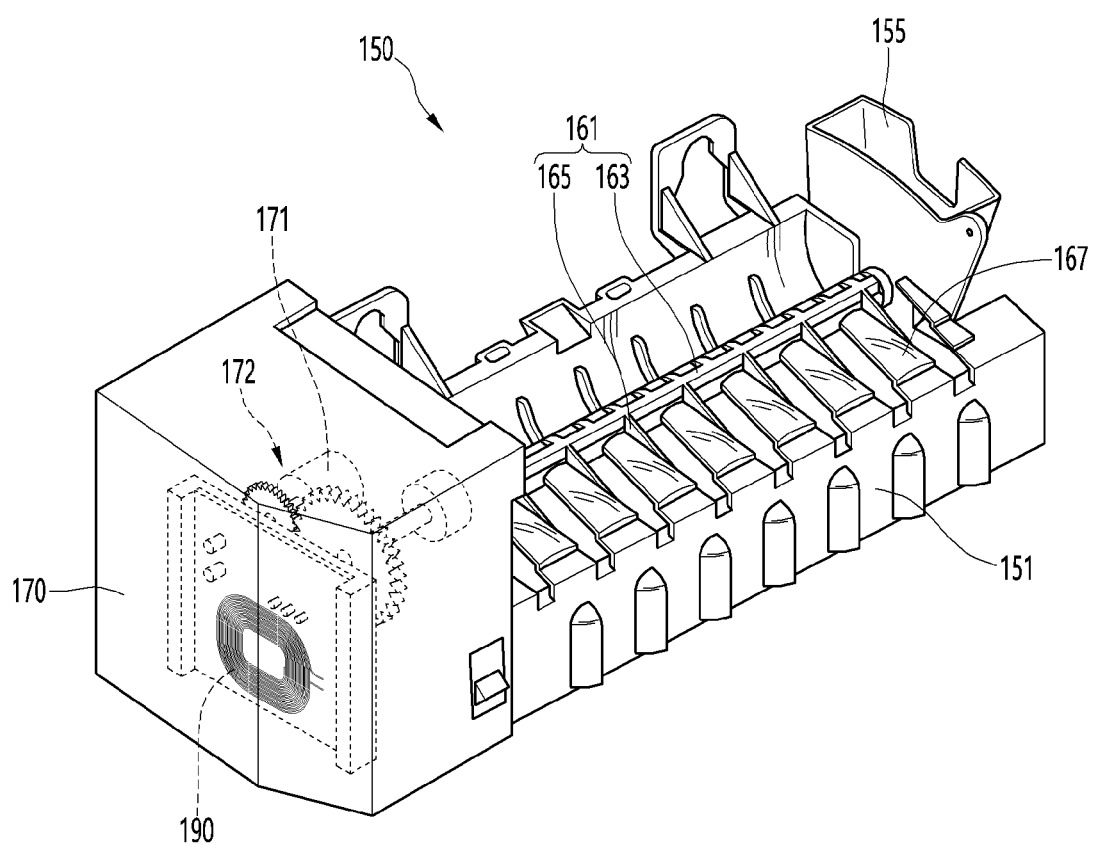
FIG. 5 is a perspective view of an ice maker according to an embodiment of the present disclosure.
Figure 6:
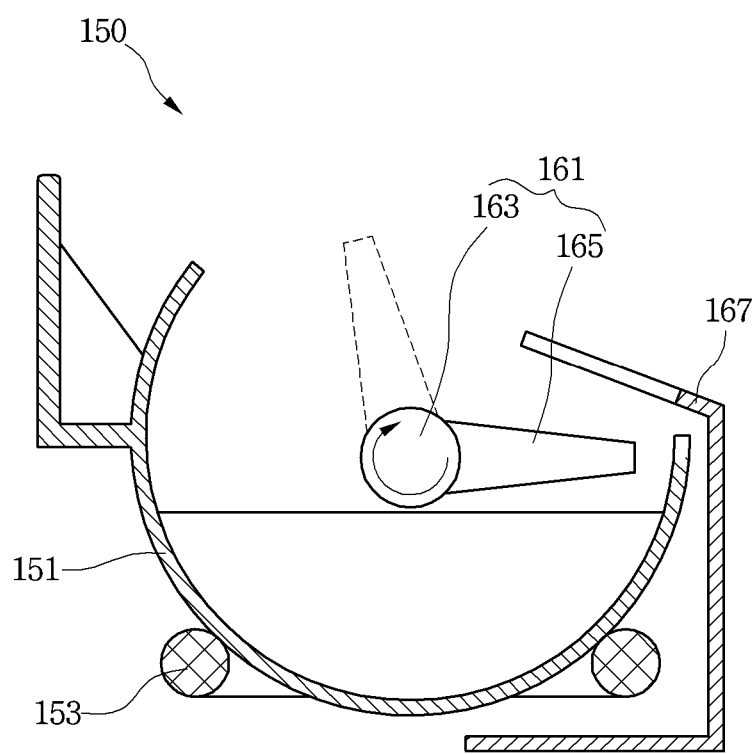
FIG. 6 is a cross-sectional view of an ice maker according to an embodiment of the present disclosure.

FIG. 5 is a perspective view of an ice maker according to an embodiment of the present disclosure, and FIG. 6 is a cross-sectional view of an ice maker according to an embodiment of the present disclosure.

Referring to FIGS. 5 and 6, the ice maker 150 may include an ice-making tray 151 to which water is supplied to produce ice with a predetermined shape, a water supply part 155 which supplies water to the ice-making tray 151, an ejector 161 which extracts ice from the ice-making tray 151, a guide portion 167 which is provided to be inclined to guide the ice extracted by the ejector 161, an ice separating heater 153 which separates the ice produced in cells by heating the ice-making tray 151, a driver 171 which drives the ejector 161, and a control box 170 in which a controller (not shown) for controlling the driver and the ice separating heater is accommodated.

The ejector 161 may include a shaft 163 and a plurality of ejector pins 165 protruding from the shaft 163 in a radial direction and spaced apart from each other along the axial direction. The ejector pins 165 may be disposed to respectively correspond to cells resulted from partition of the inside of the ice-making tray 151. Accordingly, during rotation, each ejector pin 165 may pressurize ice that has been iced (separated) in a corresponding cell to be withdrawn to the outside.

The ice separating heater 153 may be disposed on a bottom surface of the ice-making tray 151. For example, the ice separating heater 153 may be provided as a sheath heater. The ice separating heater 153 may heat a portion of the bottom surface of the ice-making tray 151 to separate ice from the ice-making tray 151. The ice separated from the ice-making tray 151 may be drawn out of the ice-making tray 151 by the ejector 161.

The driver 171 may be disposed in the control box 170. In addition, a power transfer device 172 for transferring power of the driver 171 to the shaft 163 may be provided in the control box 170. The power transfer device 172 may be provided as a gear, a belt, a pulley or the like for transferring the power of the driver 171 to the shaft 163. For example, the power transfer device 172 may be provided as a plurality of gears 172a and 172b.

The control box 170 may include the power receiver 190. The power receiver 190 may receive wireless power transmitted by a power transmitter 180 to be described later. The power transmitter 180 may be disposed at a position facing the power receiver 190. For example, the power transmitter 180 may be disposed in at least one of one side of the ice-making chamber 100 and the inside of the body 11. The ice maker 150 may operate with the wireless power received by the power receiver 190. That is, the power receiver 190 may supply power to components included in the ice maker 150. The configuration of the power receiver 190 will be described in detail with reference to FIG. 8.

Since the ice maker 150 may operate by receiving wireless power by the wireless power receiver 190, portability of the ice maker 150 can be improved. In addition, since the ice maker 150 operates by receiving wireless power by the power receiver 190, a power cable for supplying power to the ice maker 150 may be omitted. Accordingly, the ice maker 150 may be separated from the refrigerator 10 to facilitate cleaning.

Figure 7:
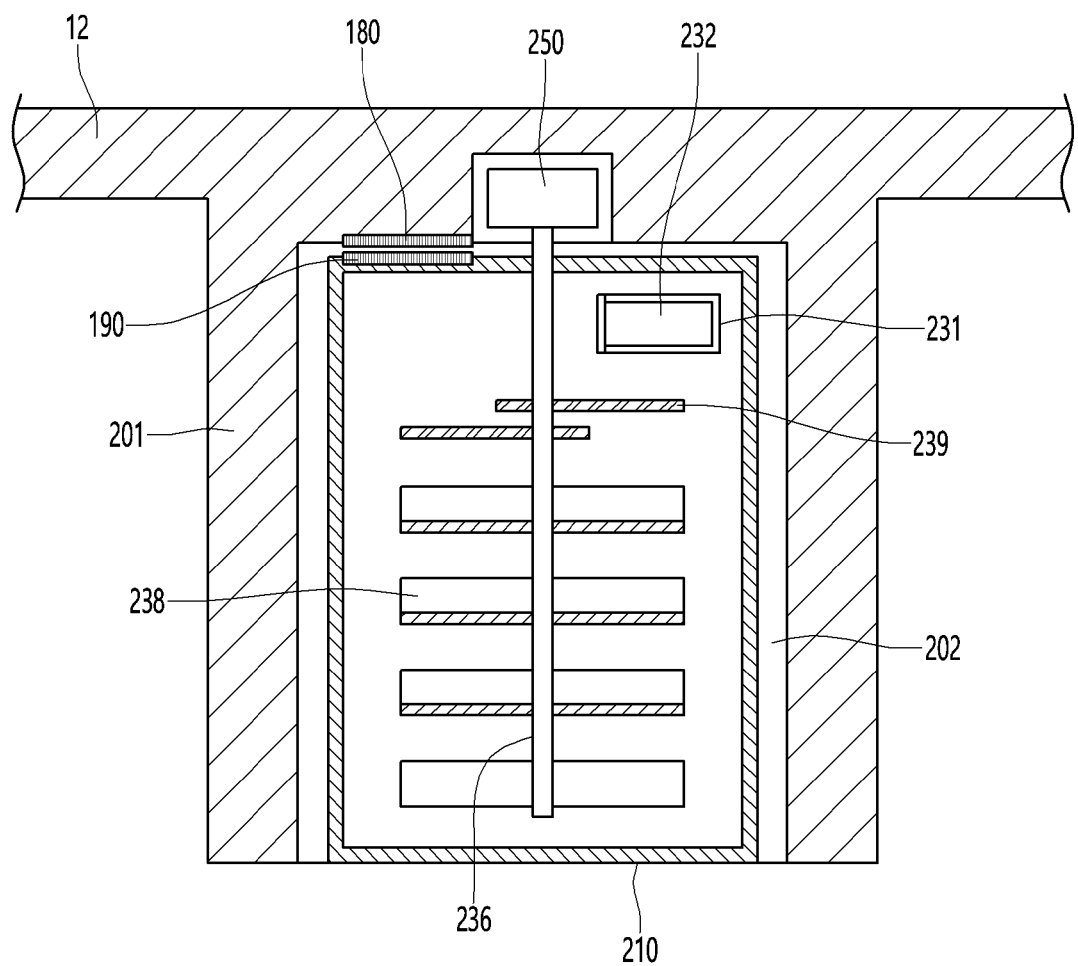
FIG. 7 is a cross-sectional view taken along line A-A of FIG. 2.

FIG. 7 is a cross-sectional view taken along line A-A of FIG. 2.

Referring to FIG. 7, the ice storage 200 according to an embodiment of the present disclosure may include a housing 201 which is provided in an inner portion of the refrigerating chamber door 12, a door 203 which selectively shields the front of the housing 201, and a storage basket 210 which is accommodated in the housing 201 and provided to be withdrawn to the front. The storage basket 210 may have a rectangular parallelepiped shape with an open upper surface.

A guide rail 207 for guiding the insertion/withdrawal of the storage basket 210 may be provided on the inner surface of the housing 201. A plurality of guide rails 207 may be provided on both sides of the housing 201. It should be noted that the position of the guide rail 207 is not limited to any one, and the guide rail 207 may be provided on the lower surface of the housing 201, unlike shown in the drawings.

A guide portion (not shown) may be provided in the storage basket 210 at a position corresponding to the guide rail 207. The guide portion may be moved along the guide rail 207 while the storage basket 210 is being withdrawn.

A seating portion 202 in which the storage basket 210 is seated may be provided inside the housing 201. The storage basket 210 may be inserted into the housing 201 while being seated on the seating portion 202. The guide rail 207 may be formed at both sides of the seating portion 202.

A sensor (not shown) may be provided on both walls of the housing 201 as a sensing device for detecting whether or not the storage basket 210 is coupled. The sensor may include a transmitter provided on one wall of the housing 201 to transmit light (signal) and a receiver provided on the other wall of the housing 201 to receive light (signal) transmitted by the transmitter. That is, whether the storage basket 210 is attached or detached may be detected by the sensor.

The storage basket 210 may include an outlet 231 from which stored ice is taken out and a shutter 232 for selectively shielding the outlet 231. When the pressing portion 21 is pressed, the shutter 232 may be rotated to open the outlet 231.

The storage basket 210 may include an auger 238 which is provided to be rotatable in the inside of the storage basket 210 to allow stored ice to move toward the outlet 231, an ice crusher 239 which is provided on one side of the auger 238 to crush ice to an appropriate size, and a rotating shaft 236 which provides a rotational center of the auger 238. The rotating shaft 236 may transfer rotational force to the auger 238 and the ice crusher 239.

A motor 250 which provides a driving force for rotation of the rotating shaft 236 may be provided at one side of the storage basket 210. The motor 250 is provided at one side of the storage basket 210 to move together with the storage basket 210. That is, the motor 250 may be separated from the refrigerator door 12. A groove into which the motor 250 may be inserted when the storage basket 210 is coupled to the housing 201 may be formed in the refrigerator door 12. Although the motor 250 is described as being fixed to the storage basket 210 to move together with the storage basket 210 in the present embodiment, the motor 250 may be provided in the refrigerator door 12. In this case, the motor 250 may be connected to the rotating shaft 236 when the storage basket 210 is coupled to the housing 201.

When the motor 250 is driven, ice in the storage basket 210 may be transferred toward the outlet 231 by the auger 238, crushed by the ice crusher 239 and then discharged through the outlet 38. The auger 238 and the ice crusher 239 may be arranged to be inclined to form a predetermined angle with respect to the door 12 or may be arranged in a vertical direction. When the auger 238 and the ice crusher 239 are arranged to be inclined or to disposed in a vertical direction, crushed ice may be easily discharged in the direction of gravity.

Meanwhile, the storage basket 210 may include a power receiver 190 for receiving wireless power. The power receiver 190 may receive wireless power transmitted from the power transmitter 180 to be described later. The wireless power received by the power receiver 190 may be supplied to the components of the storage basket 210. That is, since the storage basket 210 operates by receiving wireless power, the portability of the storage basket 210 may be improved. In addition, since the motor 250 is separated from the refrigerator door 12 when the storage basket 210 is removed, the maintenance of the motor 250 can be easily performed.

The refrigerator door 12 may include a power transmitter 180 for transmitting wireless power to the power receiver 190. The power transmitter 180 may be disposed to face the power receiver 190. When the storage basket 210 is coupled to the housing 201, the wireless power transmitted by the power transmitter 180 may be received by the power receiver 190. The components of the storage basket 210 may operate with the wireless power received by the power receiver 190.

Figure 8:
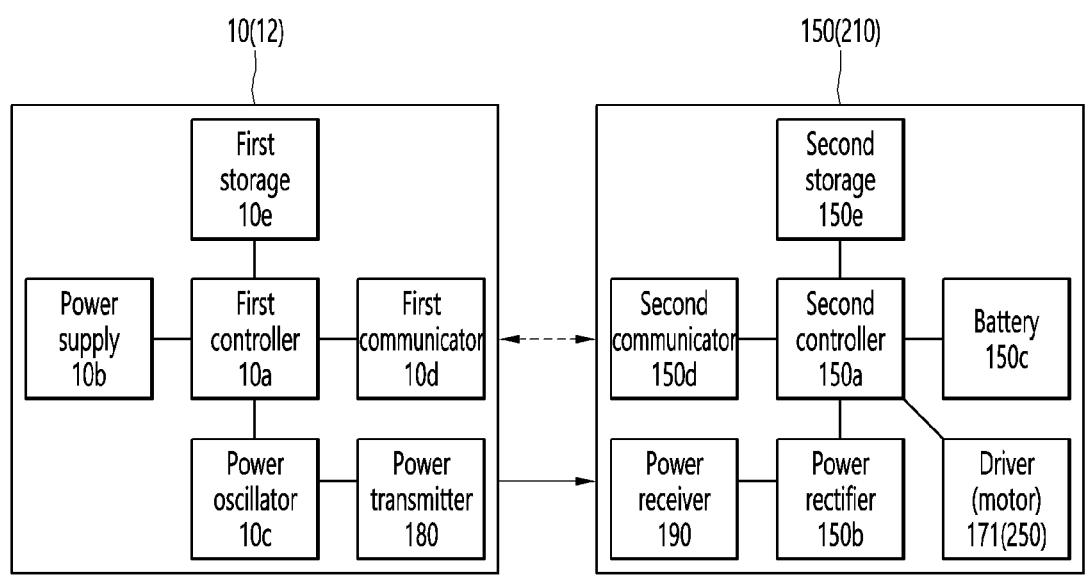
FIG. 8 is a view showing a configuration of a refrigerator according to an embodiment of the present disclosure.

FIG. 8 is a view showing a configuration of a refrigerator according to an embodiment of the present disclosure.

Referring to FIG. 8, the refrigerator 10 according to the present disclosure may include a power transmitter 180 that transmits wireless power and a power receiver 190 that receives wireless the power transmitted by the power transmitter 180. In this embodiment, the power transmitter 180 and the power receiver 190 may be provided in at least one of the ice maker 150 and the storage basket 210. That is, the power transmitter 180 may be provided in at least one of the body 11 and the refrigerator door 12. The power receiver 190 may be provided in at least one of the ice maker 150 disposed in the body 11 and the storage basket 210 disposed in the refrigerator door 12. The power transmitter 180 and the power receiver 190 may be disposed to face each other, so that the wireless power transmitted from the power transmitter 180 may be smoothly received by the power receiver 190.

It will be described below that the power transmitter 180 is provided in the refrigerator 10, but the power transmitter 180 may be provided to the refrigerator door 12.

The refrigerator 10 may include a first controller 10a. The first controller 10a may control the operation of the refrigerator 10. The first controller 10a may control the operation of the power transmitter 180, which will be described later. The first controller 10a may control the operation of the refrigerator 10 to store food stored in the refrigerator 10 at a low temperature. Also, the first controller 10a may control whether to transmit wireless power by the power transmitter 180.

The refrigerator 10 may include a power supply 10b. The power supply 10b may supply power for operating the refrigerator 10. The refrigerator 10 may operate with power supplied from the power supply 10b. The power supply 10b may receive power from a power system. That is, the power supply 10b may be understood as a configuration that receives power from the outside and transfers the power to the components of the refrigerator 10.

The refrigerator 10 may include the power transmitter 180. The power transmitter 180 may be disposed on one side of the body 11. For example, the power transmitter 180 may be provided on the inner wall of the body 11. The power transmitter 180 may wirelessly transmit power to the ice maker 150 disposed in the ice-making chamber 100. The ice maker 150 may operate by receiving wireless power transmitted from the power transmitter 180. The operation of the power transmitter 180 may be controlled by the first controller 10a. The configuration of the power transmitter 180 may be modified according to a wireless power transfer method. For example, the power transmitter 180 may be provided as a coil, an antenna, a resonator, or the like. In the present embodiment, the power transmitter 180 may transmit wireless power by a magnetic induction method or a magnetic resonance method.

The refrigerator 10 may include a power oscillator 10c. The power oscillator 10c may adjust a frequency of the wireless power transmitted from the power transmitter 180. In this case, the frequency adjusted by the power oscillator 10c may be understood as a resonant frequency of the wireless power. The wireless power adjusted to a specific frequency by the power oscillator 10c may be transmitted from the power transmitter 180. The specific frequency may be understood as a frequency of wireless power to be received by the power receiver 190, which will be described later. The operation of the power oscillator 10c may be controlled by the first controller 10a. Although referred to as the power oscillator 10c in this embodiment, it may also be referred to as a power amplifier or the like.

The refrigerator 10 may include a first communicator 10d. The first communicator 10d may transmit/receive a plurality of pieces of information to and from the ice maker 150, which will be described later. The first communicator 10d may be understood as a wireless communication module for transmitting and receiving a plurality of pieces of information or a wired communication module connected by a communication cable. The first communicator 10d may transfer information of the refrigerator 10 to the ice maker 150 or may receive information of the ice maker 150 from the ice maker 150. The first controller 10a may control the operation of the refrigerator 10 based on the plurality of pieces of information transmitted and received by the first communicator 10d.

The refrigerator 10 may include a first storage 10e. A plurality of pieces of information may be stored in the first storage 10e. A plurality of pieces of information transmitted and received by the first communicator 10d may be stored in the first storage 10e. Information on the operation of the refrigerator 10 may be stored in the first storage 10e in advance. The first controller 10a may control operations of components included in the refrigerator 10 based on the plurality of pieces of information stored in the first storage 10e.

It will be described below that the power receiver 190 is provided to the ice maker 150, but the power receiver 190 may be provided in the storage basket 210.

The ice maker 150 may include a second controller 150a. The second controller 150a may control the operation of the ice maker 150. The second controller 150a may control operations of components included in the ice maker 150. The second controller 150a may control the operation of the ice maker 150 such that ice produced by the ice maker 150 is stored in the ice storage 200. The second controller 150a may be disposed inside a control box 170 of the ice maker 150.

The ice maker 150 may include the power receiver 190. The power receiver 190 may be disposed on one side of the ice maker 150. The power receiver 190 may receive wireless power transmitted from the power transmitter 180. For example, the power receiver 190 may be disposed to face the power transmitter 180. The power receiver 190 may receive the wireless power transmitted from the power transmitter 180 and supply the wireless power to components included in the ice maker 150. The operation of the power receiver 190 may be controlled by the second controller 150a. The configuration of the power receiver 190 may be modified according to a wireless power transfer method. For example, the power receiver 190 may be provided as a coil, an antenna, a resonator, or the like. In this embodiment, the power receiver 190 may operate in a magnetic induction method or a magnetic resonance method to receive the wireless power transmitted from the power transmitter 180.

The ice maker 150 may include a power rectifier 150b. The power rectifier 150b may rectify the wireless power received by the power receiver 190 into power that may be consumed by the ice maker 150. The power resulted from rectification by the power rectifier 150b may be consumed by the components included in the ice maker 150. The operation of the power rectifier 150b may be controlled by the second controller 150a.

The ice maker 150 may include a battery 150c. The battery 150c may be disposed in the control box 170 of the ice maker 150. The battery 150c may store power for operating the ice maker 150. In this embodiment, the ice maker 150 may receive power from at least one of wireless power received by the power receiver 190 and power stored in the battery 150c. When the battery 150c is provided to the ice maker 150, the wireless power received by the power receiver 190 may charge the battery 150c. Also, when the battery 150c is provided to the ice maker 150, the power stored in the battery 150c may be consumed as standby power for the components included in the ice maker 150. Meanwhile, the battery 150c may not be provided in the ice maker 150. When the battery 150c is not provided to the ice maker 150, the ice maker 150 may be operated with the wireless power received through the power receiver 190. However, this embodiment is described under the assumption that the battery 150c is provided.

The ice maker 150 may include the second communicator 150d. The second communicator 150d may transmit/receive a plurality of pieces of information to and from the refrigerator 10. The second communicator 150d may be understood as a wireless communication module for transmitting and receiving a plurality of pieces of information or a wired communication module connected by a communication cable. The ice maker 150 may transfer information about the ice maker 150 to the refrigerator 10 through the second communicator 150d. The ice maker 150 may receive information about the refrigerator 10 from the refrigerator 10 through the second communicator 150d. The operation of the second communicator 150d may be controlled by the second controller 150a.

The ice maker 150 may include a second storage 150e. The plurality of pieces of information may be stored in the second storage 150e. The plurality of pieces of information transmitted and received by the second communicator 150d may be stored in the second storage 150e. Information about the operation of the ice maker 150 may be stored in the second storage 150e in advance. The operation of the second storage 150e may be controlled by the second controller 150a. The second controller 150a may control the operation of the ice maker 150 based on a plurality of pieces of information stored in the second storage 150e.

The ice maker 150 may include a driver 171. The driver 171 may be disposed in the control box 170. The driver 171 may rotate the shaft 163 of the ejector 161 such that the ejector pin 165 of the ejector 161 is driven. The ejector 161 may separate ice produced in the ice-making tray 151 from the ice-making tray 151. The ice separated from the ice-making tray 151 by the ejector 161 may be stored in the ice storage 200. The operation of the driver 171 may be controlled by the second controller 150a. The driver 171 and the shaft 163 may be connected by the power transfer device 172 so that the power of the driver 171 may be transferred to the shaft 163. The driver 171 may operate by receiving wireless power received from the power receiver 190.

According to the present disclosure, the ice maker 150 disposed in the ice-making chamber 100 may operate by receiving wireless power transmitted from the power transmitter 180 of the body 11. Since the ice maker 150 operates by receiving wireless power from the body 11, portability of the ice maker 150 may be improved. That is, in order to supply power to the ice maker 150, a power cable connecting the body 11 and the ice maker 150 may be omitted. Since the power cable is omitted, it is possible to prevent a safety accident that may occur inside the refrigerator 10 due to damage to the power cable.

In addition, since the ice maker 150 receiving wireless power can be smoothly separated from the body 11, there is an advantage in that the maintenance work for the ice maker 150 is facilitated. Since the ice maker 150 is smoothly separated, there is an advantage in that the cleaning operation for the ice maker 150 is facilitated.

Figure 9:
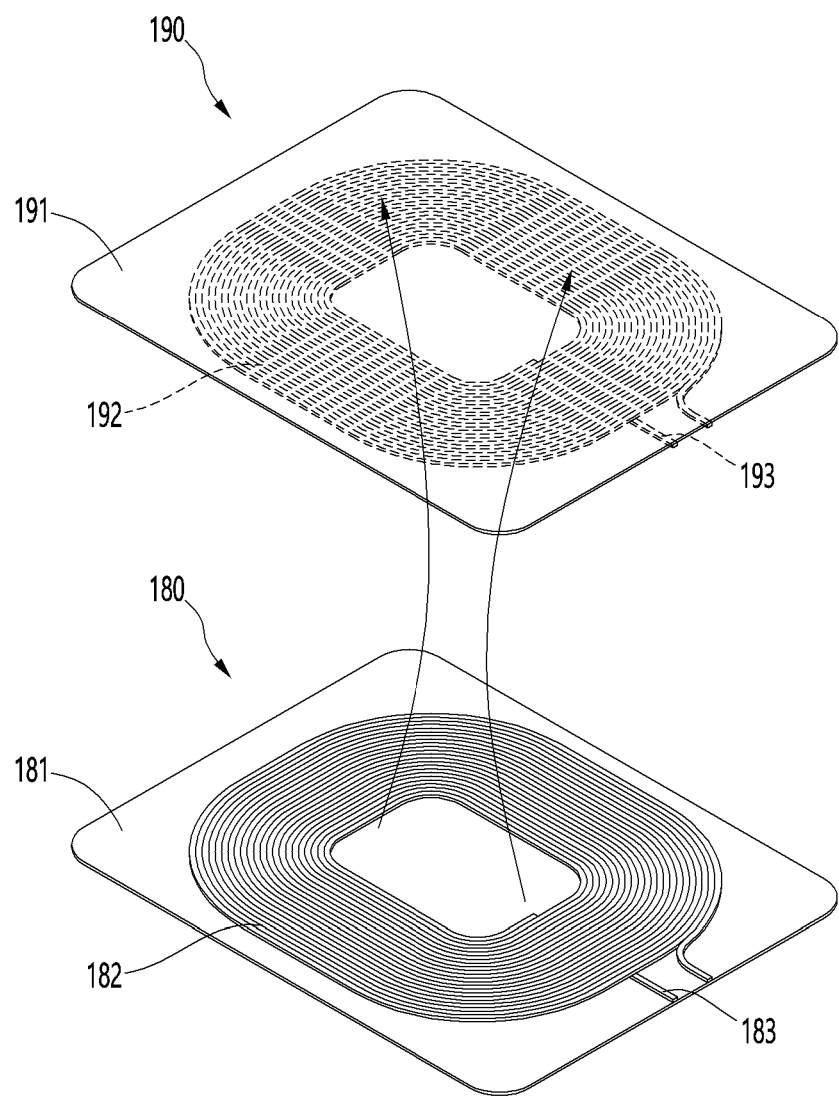
FIG. 9 is a view illustrating a power transmitter and a power receiver according to an embodiment of the present disclosure.

FIG. 9 is a view illustrating a power transmitter and a power receiver according to an embodiment of the present disclosure.

Referring to FIG. 9, the power transmitter 180 according to the present disclosure may be configured to transmit wireless power. The power receiver 90 may be configured to receive the wireless power transmitted from the power transmitter 180. In the present embodiment, the power transmitter 180 and the power receiver 190 may transmit/receive wireless power according to a magnetic induction method or a magnetic resonance method. In addition, the power transmitter 180 and the power receiver 190 are disposed to face each other, and the wireless power transmitted from the power transmitter 180 may be received by the power receiver 190. Hereinafter, the structures of the power transmitter 180 and the power receiver 190 configured to transmit and receive wireless power respectively will be described. In this embodiment, the power transmitter 180 and the power receiver 190 may be formed to have a coil structure. In this case, the power transmitter 180 may be defined as a primary coil, and the power receiver 190 may be defined as a secondary coil. That is, the wireless power transmitted from the power transmitter 180 serving as the primary coil may be received by the power receiver 190 serving as the secondary coil.

The power transmitter 180 may include a first coil 182 and a first coil support 181. The first coil 182 may be provided in a wound state in a specific shape. For example, the first coil 182 may be supported by the first coil support 181 while being wound in a circle. The first coil 182 may be installed on the body 11 while being supported by the first coil support 181. A seating groove in which the first coil 182 may be seated may be formed in the first coil support 181.

The power transmitter 180 may include a first terminal 183. The first terminal 183 may be defined as one end and the other end of the first coil 182 wound in a circle. The first terminal 183 may electrically connect the power transmitter 180 and the first controller 10a. That is, electricity may be applied to the first coil 182 through the first terminal 183.

When a current is applied to the first coil 182 of the power transmitter 180, an electromagnetic field may occur in the first coil 182. The electromagnetic field occurring in the first coil 182 may cause an electromotive force to be induced in the second coil 192 of the power receiver 190 to be described later. When the electromotive force is induced in the second coil 192, a current flow may be caused in the second coil 192, and power may be supplied to the power receiver 190.

The power receiver 190 may include a second coil 192 and a second coil support 191. The second coil 192 may be provided to be wound in a specific shape. For example, the second coil 192 may be supported by the second coil support 191 while being wound in a circle. The second coil 192 may be installed on the refrigerator door 12 while being supported by the second coil support 191. A seating groove in which the second coil 192 may be seated may be formed in the second coil support 191.

The power receiver 190 may include a second terminal 193. The second terminal 193 may be defined as one end and the other end of the second coil 192 wound in a circle. The second terminal 193 may electrically connect the power receiver 190 and the second controller 150a. That is, electricity may be applied to the second controller 150a through the second terminal 193.

The second coil 192 of the power receiver 190 may receive the electromagnetic field occurring in the first coil 182. When the electromagnetic field is applied to the second coil 192, an electromotive force may be induced in the second coil 192. When the electromotive force is induced in the second coil 192, power may be supplied to the power receiver 190. When the power receiver 190 is far away from the power transmitter 180, the electromagnetic field from the power transmitter 180 may not be received by the power receiver 190, and power supply may be stopped. When the power supply to the power receiver 190 is stopped, the second controller 150a may receive power from the battery 150c.

Figure 10:
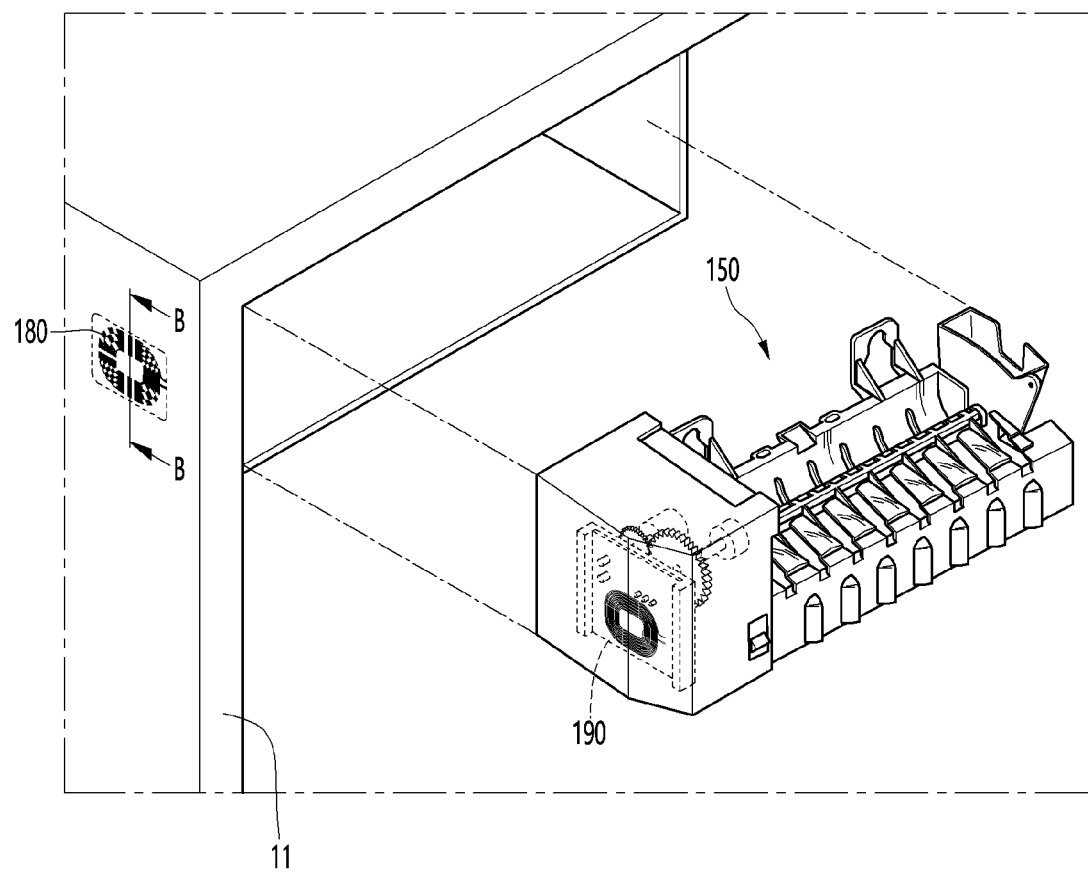
FIG. 10 is a perspective view showing an ice maker according to an embodiment of the present disclosure.
Figure 11:
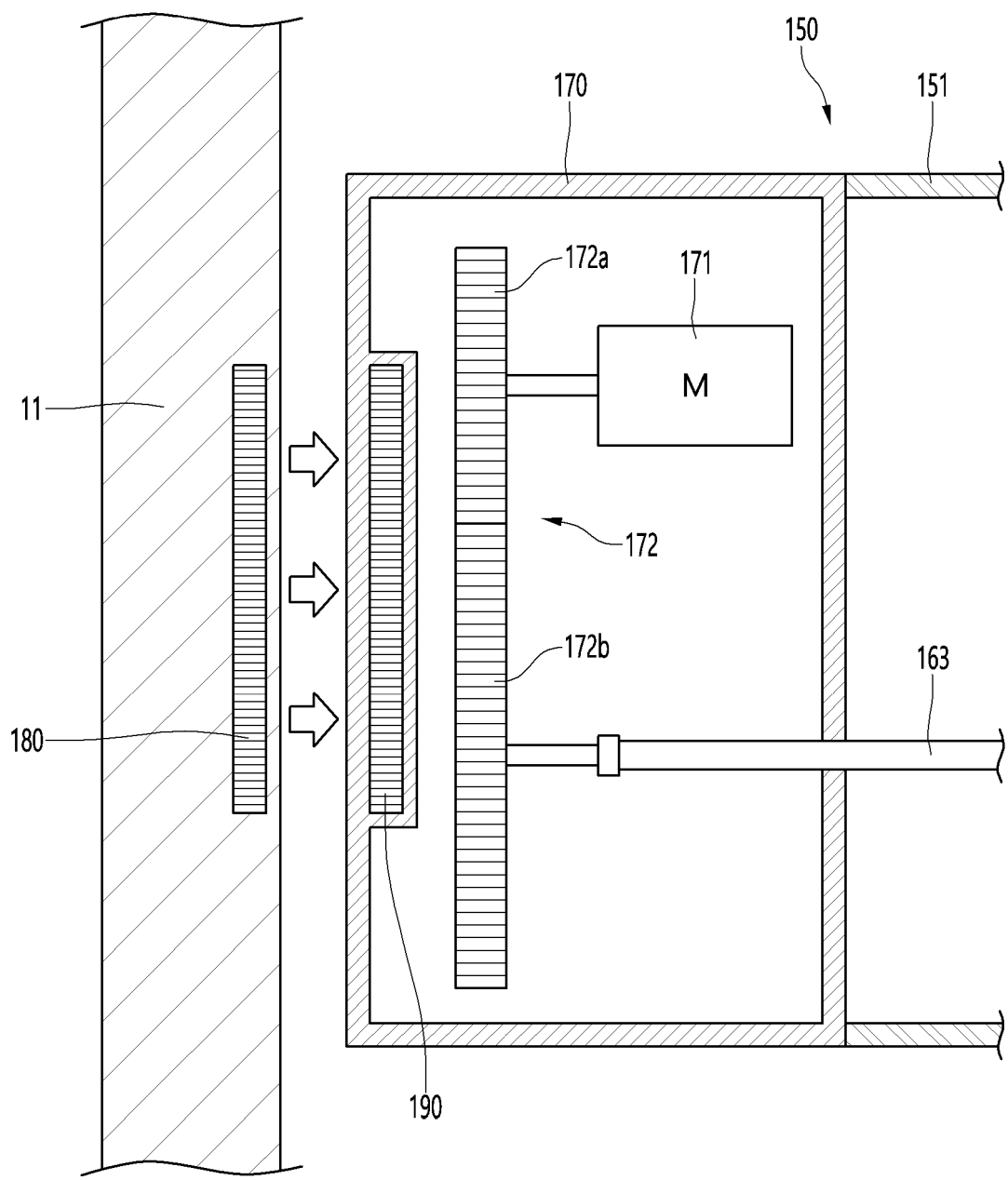
FIG. 11 is a cross-sectional view taken along line B-B of FIG. 10.
Figure 12:
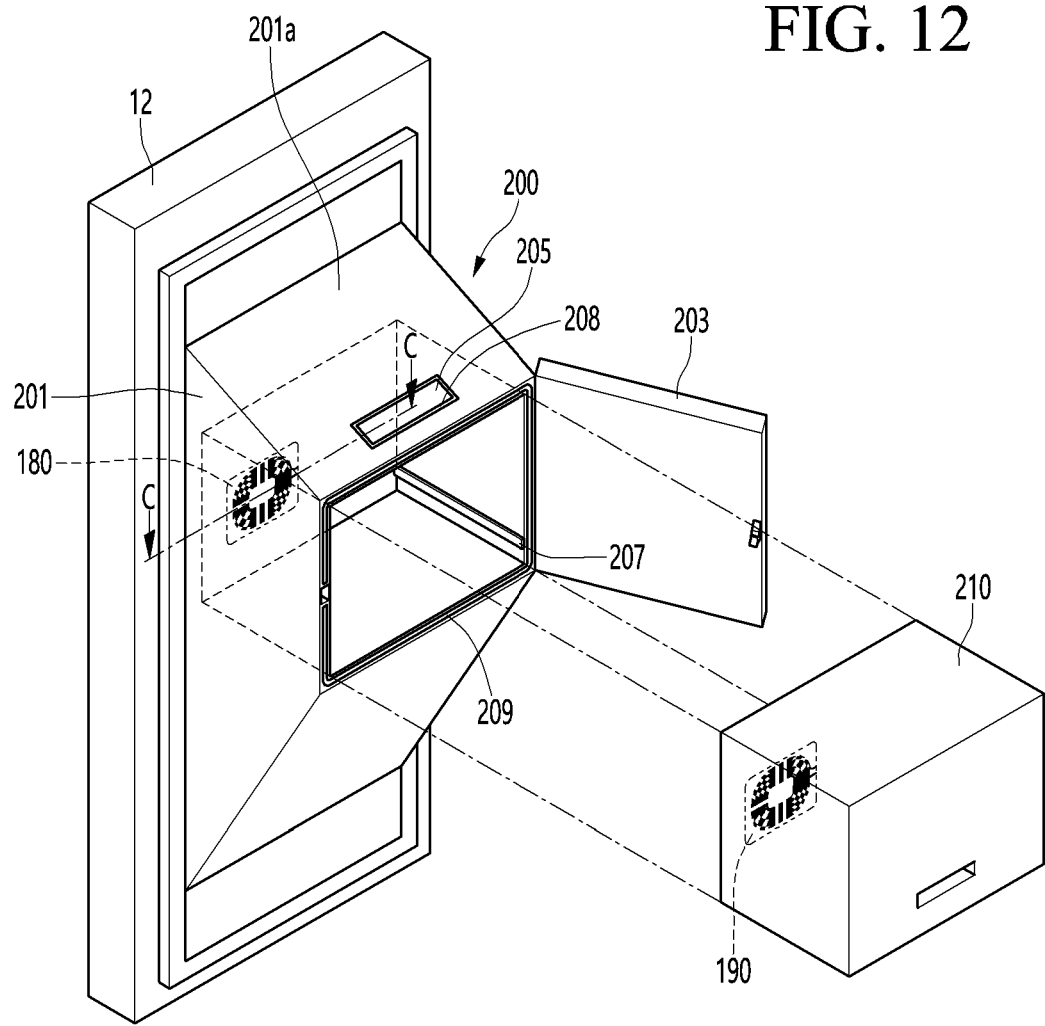
FIG. 12 is a perspective view showing a storage basket according to an embodiment of the present disclosure.
Figure 13:
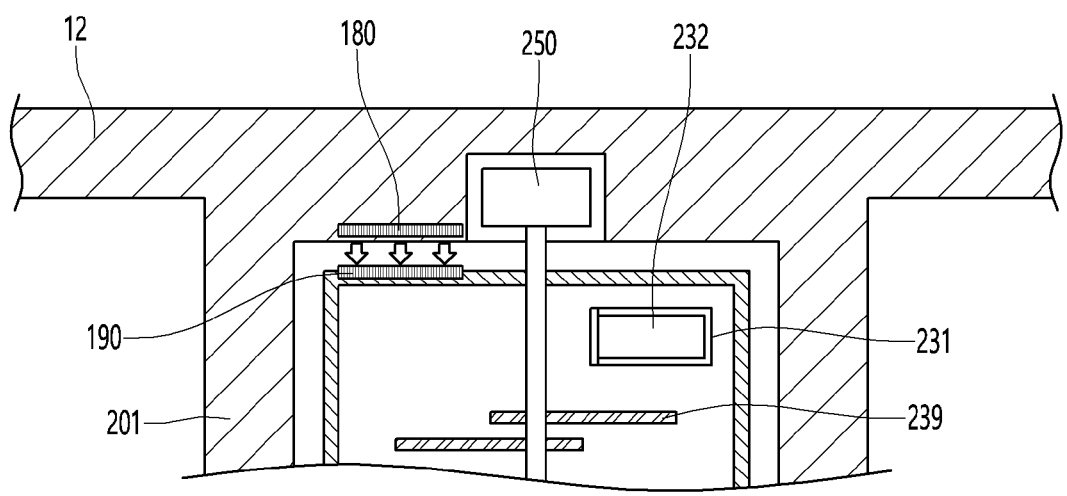
FIG. 13 is a cross-sectional view taken along line C-C of FIG. 12.

FIG. 10 is a perspective view showing an ice maker according to an embodiment of the present disclosure, FIG. 11 is a cross-sectional view taken along line B-B of FIG. 10, FIG. 12 is a perspective view showing a storage basket according to an embodiment of the present disclosure, and FIG. 13 is a cross-sectional view taken along line C-C of FIG. 12.

In this embodiment, the power transmitter 180 may be provided in at least one of the body 11 and the refrigerator door 12, and the power receiver 190 may be provided in at least one of the ice maker 150 and the storage basket 210.

Hereinafter, a case in which the power transmitter 180 and the power receiver 190 are respectively provided to the body 11 and the ice maker 150 will be described with reference to FIG. 9, and a case in which the power transmitter 180 and the power receiver 190 are respectively provided to the refrigerator door 12 and the storage basket 210 will be described with reference to FIG. 10.

Referring to FIGS. 10 and 11, the power transmitter 180 may be disposed in an inner portion of the body 11. The power transmitter 180 may be disposed in one side of the body 11.

The power receiver 190 may be disposed at one side of the ice maker 150 facing the power transmitter 180. The power receiver 190 may receive wireless power transmitted from the power transmitter 180.

The power transmitter 180 may control whether to transmit wireless power according to whether or not the ice maker 150 is present in the ice-making chamber 100. For example, when it is recognized that the ice maker 150 is disposed in the ice-making chamber 100, the power transmitter 180 may transmit wireless power. To this end, a sensor for determining the existence or absence of the ice maker 150 may be provided in the ice-making chamber 100. On the other hand, the power transmitter 180 may continuously transmit wireless power.

The ice maker 150 may be detachably attached to the inside of the ice maker 100. Ice may be produced in the ice maker 150 by the cold air inside the ice-making chamber 100. The produced ice may be separated from the ice maker 150 by the ice separating heater 153, the ejector 161, and the driver 171. The ice separating heater 153 may separate ice from the ice-making tray 151. The ejector 161 and the driver 171 may transfer the ice separated from the ice-making tray 151 by the ice separating heater 153 to the ice storage 200.

Since the ice maker 150 according to the present disclosure operates by receiving wireless power from the body 11, the ice maker 150 may be easily separated from the body 11, and the power cable for supplying power to the ice maker 150 may be omitted. According to the present disclosure, portability of the ice maker 150 may be improved, and maintenance work for the ice maker 150 may be facilitated by separating the ice maker 150 from the body 11.

Referring to FIGS. 12 and 13, the power transmitter 180 may be provided in the refrigerator door 12. The power transmitter 180 may be disposed in an inner portion of the refrigerator door 12. The power transmitter 180 may be disposed on one side of the refrigerator door 12.

The power receiver 190 may be disposed on one side of the storage basket 210 facing the power transmitter 180. The power receiver 190 may receive wireless power transmitted from the power transmitter 180.

The power transmitter 180 may control whether to transmit wireless power according to whether the storage basket 210 is present or not in the housing 201 of the refrigerator door 12. For example, when the storage basket 210 is disposed in the housing 201, the power transmitter 180 may transmit wireless power. To this end, a sensor for determining the existence or absence of the storage basket 210 may be provided in the refrigerator door 12. On the other hand, the power transmitter 180 may continuously transmit wireless power.

The storage basket 210 may be mounted on the housing 201 of the refrigerator door 12. The storage basket 210 may store ice separated from the ice maker 150. The ice stored in the storage basket 210 may be provided to the outside at a user's request. The ice stored in the storage basket 210 may be crushed by the ice crusher 239, the rotating shaft 236, and the motor 250 and then discharged to the outside.

Since the storage basket 210 according to the present disclosure operates by receiving wireless power from the refrigerator door 12, the storage basket 210 can be easily separated from the refrigerator door 12, and a power cable for supplying power to the motor 250 provided in the storage basket 210 may be omitted. According to the present disclosure, the portability of the storage basket 210 is improved, and maintenance work for multiple configurations, such as the motor 250 provided in the storage basket 210, may be facilitated in a state in which the storage basket 210 is separated from the refrigerator door 12. In addition, since the motor 250 can be integrally formed with the storage basket 210, the load on the refrigerator door 12 can be reduced.

The invention claimed is:

1. A refrigerator comprising:
   a body having an open front;
   a refrigerator door configured to shield the open front of the body;
   an ice storage provided on the refrigerator door to store ice;
   an ice-making chamber provided in the body to produce the ice;
   an ice maker disposed in the ice-making chamber to transfer the produced ice to the ice storage;
   a power receiver provided at the ice maker to receive wireless power; and
   a power transmitter disposed on one side of one of the body and the ice-making chamber to transmit wireless power to the power receiver.

2. The refrigerator of claim 1, wherein the ice maker includes
   an ice-making tray configured to store water for making ice;
   an ice separating heater configured to heat a portion of the ice-making tray to separate ice from the ice-making tray;
   an ejector configured to transfer the ice separated by the ice separating heater; and
   a driver configured to drive the ejector.

3. The refrigerator of claim 2, wherein the ice separating heater and the driver are operated by wireless power received by the power receiver.

4. The refrigerator of claim 2, wherein the ice maker includes
   a controller configured to control operations of the power receiver, the ice separating heater, and the driver; and
   a battery configured to be charged with the power received by the power receiver.

5. The refrigerator of claim 1, wherein the body includes
   a first communicator configured to transmit and receive information to and from the ice maker; and a first storage configured to store information transmitted and received to and from the first communicator.

6. The refrigerator of claim 5, wherein the ice maker includes
a second communicator configured to transmit and receive information to and from the first communicator; and
a second storage configured to store information transmitted and received to and from the second communicator.

7. The refrigerator of claim 5, wherein the body includes
a controller configured to control an operation of the power transmitter; and
a power supply configured to supply power to be transmitted by the power transmitter.

8. The refrigerator of claim 1, wherein the power receiver is disposed on one side of the ice maker, and
wherein the power transmitter is disposed on one side of the body facing the power receiver or one side of the ice-making chamber when the ice maker is mounted in the ice-making chamber.

9. The refrigerator of claim 1, wherein the ice storage includes
a housing formed in the refrigerator door; and
a storage basket mounted on the housing to store ice transferred by the ice maker, further comprising:
a power transmitter disposed on one side of the housing to transmit wireless power,
a power receiver disposed on one side of the storage basket to receive the wireless power.

10. The refrigerator of claim 9, wherein the storage basket includes
a rotating shaft configured to rotate an ice crusher for crushing stored ice and an auger for transferring the crushed ice; and
a motor configured to provide a driving force to the rotating shaft and operate with the wireless power received by the power receiver.

11. The refrigerator of claim 10, wherein the storage basket includes
a controller configured to control operations of the power receiver and the motor; and
a battery configured to be charged with the wireless power received by the power receiver.

12. The refrigerator of claim 9, wherein the power transmitter is disposed on a rear surface of the refrigerator door, and
wherein the power receiver is disposed on one surface of the storage basket facing the rear surface of the refrigerator door.

13. The refrigerator of claim 9, wherein the power transmitter is disposed on an inner surface of the housing, and
wherein the power receiver is disposed on one side of the storage basket facing the power transmitter.

14. The refrigerator of claim 9, wherein the refrigerator door includes
a controller configured to control an operation of the power transmitter; and
a power supply configured to supply power to be transmitted by the power transmitter.

15. The refrigerator of claim 9, wherein the refrigerator door includes
a first communicator configured to transmit and receive information to and from the storage basket; and
a first storage configured to store information transmitted and received to and from the first communicator.

16. The refrigerator of claim 9, wherein the storage basket includes
a second communicator configured to transmit and receive information to and from the first communicator; and
a second storage configured to store information transmitted and received to and from the second communicator.

17. The refrigerator of claim 9, wherein the power receiver is disposed on one side of the ice maker, and
wherein the power transmitter is disposed on one side of the body facing the power receiver or one side of the ice-making chamber when the ice maker is mounted in the ice-making chamber.

18. The refrigerator of claim 9, wherein the power transmitter is disposed on an inner surface of the housing, and
wherein the power receiver is disposed on one side of the storage basket facing the power transmitter.

* * * * *